(12) United States Patent
El Baraka et al.

(10) Patent No.: US 10,715,000 B2
(45) Date of Patent: Jul. 14, 2020

(54) ROTARY ELECTRICAL MACHINE WHICH MINIMIZES ELECTROMAGNETIC DISTURBANCES SUSTAINED BY MEASUREMENT ELEMENT

(71) Applicant: VALEO EQUIPEMENTS ELECTRIQUES MOTEUR, Creteil (FR)

(72) Inventors: Khadija El Baraka, Serris (FR); Svetislav Jugovic, Athis-Mons (FR)

(73) Assignee: Valeo Equipements Electriques Moteur, Creteil (FR)

( * ) Notice: Subject to any disclaimer, the term of this patent is extended or adjusted under 35 U.S.C. 154(b) by 513 days.

(21) Appl. No.: 15/485,396

(22) Filed: Apr. 12, 2017

(65) Prior Publication Data

US 2017/0310181 A1 Oct. 26, 2017

(30) Foreign Application Priority Data

Apr. 20, 2016 (FR) ...................... 16 53508

(51) Int. Cl.
*H02K 3/28* (2006.01)
*H02K 11/215* (2016.01)
*H02K 3/50* (2006.01)
*H02K 3/12* (2006.01)

(52) U.S. Cl.
CPC ............ *H02K 3/28* (2013.01); *H02K 3/12* (2013.01); *H02K 3/50* (2013.01); *H02K 11/215* (2016.01)

(58) Field of Classification Search
CPC .......... H02K 3/28; H02K 3/50; H02K 11/215; H02K 3/12

USPC .......................... 310/71, 179, 184, 254, 260
See application file for complete search history.

(56) References Cited

U.S. PATENT DOCUMENTS

| | | | |
|---|---|---|---|
| 7,126,245 B2 | 10/2006 | Even et al. | |
| 7,145,273 B2 * | 12/2006 | Even ................. | H02K 3/12 310/71 |
| 8,450,899 B2 | 5/2013 | Umeda et al. | |
| 8,916,999 B2 * | 12/2014 | Imai .................. | H02K 1/2746 310/156.45 |
| 2009/0127948 A1 * | 5/2009 | Shimizu ............. | H02K 3/50 310/71 |

(Continued)

FOREIGN PATENT DOCUMENTS

| | | |
|---|---|---|
| CN | 101958589 A | 1/2011 |
| DE | 102008060262 A1 | 6/2010 |

(Continued)

*Primary Examiner* — Hanh N Nguyen
(74) *Attorney, Agent, or Firm* — Berenato & White, LLC

(57) ABSTRACT

The invention relates mainly to a rotary electrical machine comprising: a rotor (12); a device (51) for measurement of the angular position of the rotor (12); a stator (11) comprising: a body comprising a plurality of notches; a winding (24) comprising a plurality of phase windings, each having a winding input and a winding output; each phase winding being formed by a plurality of pins (45) inserted in the notches and forming a chignon (40); at least one connector (48) which connects two pins of a single winding; the connector (48) extending opposite the measurement element (52); the connector (48) comprising a portion which is situated radially between an outer periphery of the body (23) and a base of a notch.

19 Claims, 2 Drawing Sheets

(56) References Cited

U.S. PATENT DOCUMENTS

2014/0375154 A1* 12/2014 Sugiura .................... H02K 3/28
310/54

FOREIGN PATENT DOCUMENTS

DE  102010040857 A1  3/2012
FR      2868620 A1  10/2005

* cited by examiner

ROTARY ELECTRICAL MACHINE WHICH MINIMIZES ELECTROMAGNETIC DISTURBANCES SUSTAINED BY MEASUREMENT ELEMENT

CROSS-REFERENCE TO RELATED APPLICATIONS AND CLAIM TO PRIORITY

This application is related to Patent Application No. 1653508 filed Apr. 20, 2016 in France, the disclosure of which is incorporated herein by reference and to which priority is claimed.

FIELD OF THE INVENTION

The present invention relates to a rotary electrical machine which minimises the electromagnetic disturbances sustained by a measurement element.

BACKGROUND OF THE INVENTION

In a known manner, rotary electrical machines comprise a stator and a rotor integral with a shaft. The rotor can be integral with a drive and/or driven shaft, and can belong to a rotary electrical machine in the form of an alternator, an electric motor, or a reversible machine which can operate in both modes.

The stator is fitted in a housing which is designed to rotate the shaft on bearings by means of rollers. The rotor comprises a body formed by a stack of sheets of plates maintained in the form of a set by means of an appropriate securing system. The rotor comprises poles, formed for example by permanent magnets accommodated in cavities provided in the magnetic mass of the rotor. Alternatively, in a so-called "projecting" poles architecture, the poles are formed by coils wound around arms of the rotor.

In addition, the stator comprises a body constituted by a stack of thin plates forming a crown, the inner face of which is provided with notches open towards the interior in order to receive phase windings. These windings pass through the notches in the stator body, and form a chignon on both sides of the stator body. The phase windings are obtained for example from a continuous wire covered with enamel, or from conductive elements in the form of pins which are connected to one another by welding. These windings are polyphase windings which are connected in the form of a star or a triangle, the outputs of which are connected to an electric control module.

Connectors form the electrical connection between two pins of a single phase winding. In certain configurations, a connector extends circumferentially opposite a measurement element which makes it possible to determine the angular position of the rotor of the machine. However, because of the current which passes through it, a connector of this type generates a magnetic field which disrupts the signals obtained from the measurement element.

SUMMARY OF THE INVENTION

The objective of the invention is to eliminate this disadvantage efficiently by proposing a rotary electrical machine comprising:
  a rotor;
  a device for measurement of the angular position of said rotor, comprising a measurement element which can generate signals for measurement of the angular position of said rotor;
  a stator comprising:
    a stator body comprising a plurality of notches;
    a winding comprising a plurality of phase windings, each having a winding input and a winding output; each phase winding being formed by a plurality of pins inserted partially in said notches and forming a chignon; and
    at least one connector which connects electrically two pins of a single phase winding, these pins being spaced angularly from one another by at least two consecutive pins; said connector extending circumferentially along said chignon, and opposite said measurement element, wherein said connector comprises a portion which is situated radially between an outer periphery of said stator body and a base of a notch.

Connectors of this type permit predetermined angular positioning of the phase outputs of a single winding of the stator. They make it possible for example to form an angle of 60° between each phase output of a single winding of the stator.

By positioning the connector spaced from the measurement element, the invention thus makes it possible to avoid magnetic interference between the connector and the measurement signals generated by the measurement element.

According to one embodiment, the rotor comprises an axis of rotation, the machine being arranged such that a plane which passes via the axis of rotation exists, said plane intersecting both the measurement element and said connector.

According to one embodiment, the plane which passes via the axis of rotation intersects both the measurement element and said portion of the connector situated radially between an outer periphery of the stator body and a base of a notch.

According to one embodiment, said connector is situated radially at least partially between an outer periphery of said stator body and said chignon.

According to one embodiment, said connector is arranged axially relative to an axial end face of said stator body, at a height which is equal to, or less than, and in particular strictly less than, a height of said chignon. As a variant, in the case of chignons with small dimensions, the height of the connector can be strictly more than that of the chignon.

According to one embodiment, said device for measurement of the angular position of said rotor comprises a magnetic target.

According to one embodiment, said device for measurement of the angular position of said rotor comprises a wall forming a protective magnetic screen positioned radially between said connector and said magnetic target. This makes it possible to prevent the connector from disrupting the measurement element.

According to one embodiment, said connector is arranged axially relative to an axial end face of said stator body, at a height which is equal to, or less than, a height of said wall forming a protective magnetic screen.

According to one embodiment, said magnetic target is arranged radially between said wall and said measurement element.

According to one embodiment, said measurement element is a Hall-effect sensor.

According to one embodiment, at least two phase windings are connected electrically to one another by their winding output on a winding connection electrical conductor, said chignon being arranged radially between said winding connection electrical conductor and an inner periphery of said stator body.

According to one embodiment, in a radial direction of displacement, the configuration of said rotary electrical machine is such that an outer periphery of said stator body, said winding connection electrical conductor, said connector, and said chignon are encountered in succession.

According to one embodiment, said winding connection electrical conductor is in the form of an arc of a circle.

According to one embodiment, the rotary electrical machine comprises a plurality of connectors. In one example, the rotary electrical machine comprises 6 connectors. In another example, the electrical machine comprises as many connectors as there are phase windings.

According to one embodiment, a single connector from amongst the plurality of connectors comprises a portion which is situated radially between an outer periphery of the stator body and a base of a notch.

According to one embodiment, several connectors from amongst the plurality of connectors comprise a portion which is situated radially between an outer periphery of the stator body and a base of a notch.

According to one embodiment, the assembly of the connectors comprises a portion which is situated radially between an outer periphery of the stator body and a base of a notch.

BRIEF DESCRIPTION OF THE DRAWINGS

The invention will be better understood by reading the following description and examining the figures which accompany it. These figures are provided purely by way of illustration, and in no way limit the invention.

Elements which are identical, similar or analogous retain the same reference from one figure to another.

DETAILED DESCRIPTION OF THE PREFERRED EMBODIMENT(S)

Figure 1:
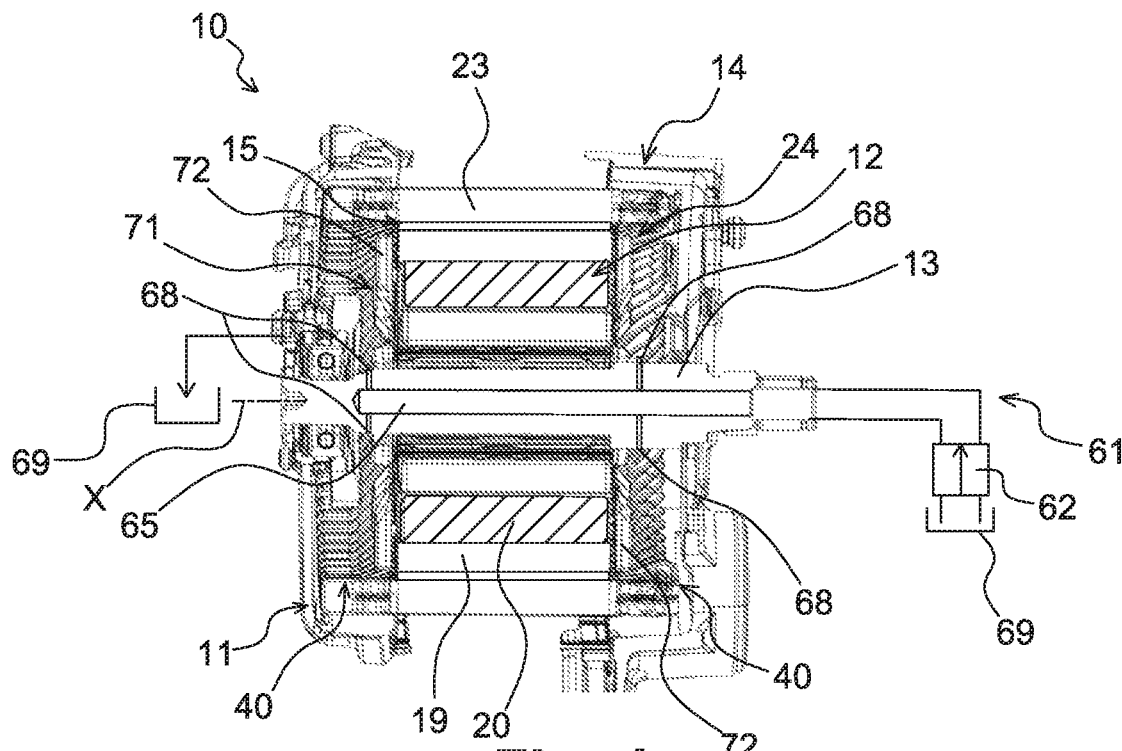
FIG. 1 is a view in longitudinal cross-section of the rotary electrical machine according to the present invention.

FIG. 1 shows a rotary electrical machine 10 comprising a polyphase stator 11 with an axis X corresponding to the axis of the machine. The stator 11 surrounds a rotor 12 fitted on a shaft 13 with the presence of an air gap 15 between the inner periphery of the stator 11 and the outer periphery of the rotor 12. The stator 11 is fitted such as to rotate in the housing 14.

The machine 10 can function in an alternator mode, in particular in order to supply energy to the battery and to the on-board network of the vehicle, and if applicable in a motor mode, in order to ensure the starting of the thermal engine of the vehicle, and optionally participate in the traction of the vehicle, alone or in combination with the thermal engine.

More specifically, the rotor 12 comprises a body 19 in the form of a set of plates. Permanent magnets 20 are implanted in cavities in the body 19. The magnets 20 can be made of rare earth or ferrite, depending on the applications and the power required for the machine 10. Alternatively, the poles of the rotor 12 can be formed by coils.

In addition, the stator 11 comprises a body 23 constituted by a set of plates, as well as a winding 24. The body 23 is formed by a stack of sheets of plates which are independent from one another, and held in the form of a set by means of a suitable securing system.

Figure 2:
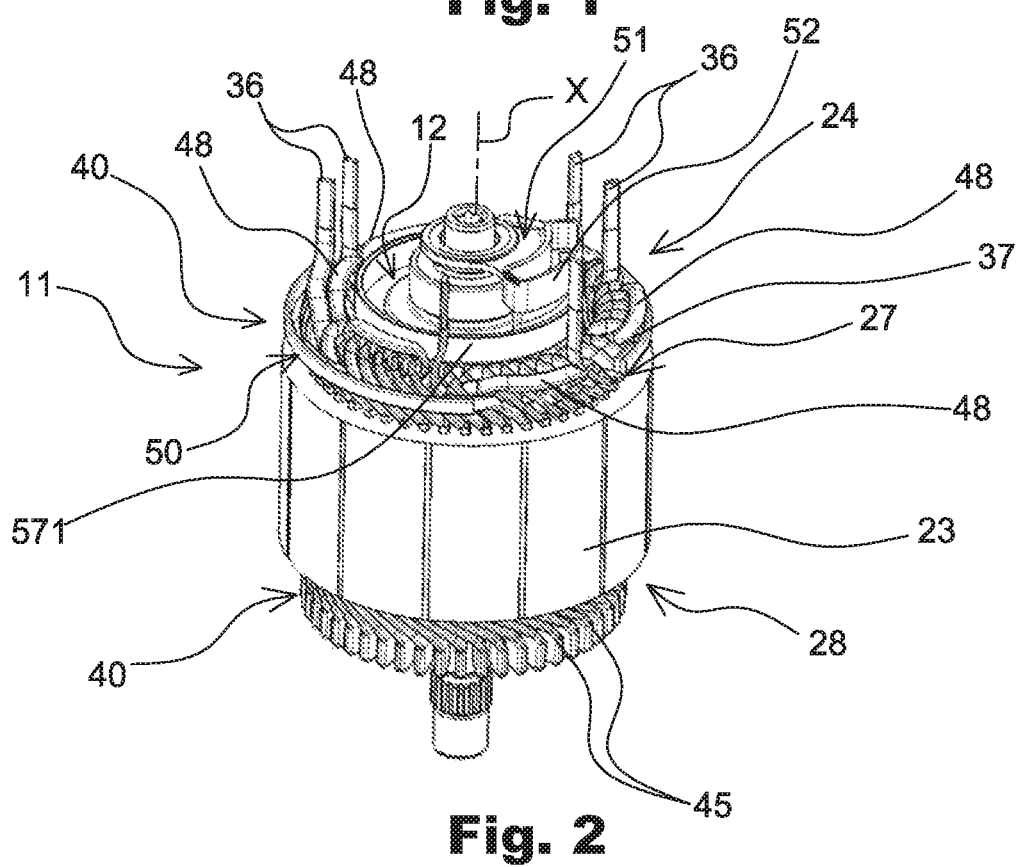
FIG. 2 is a view in perspective of the rotor and the stator of the rotary electrical machine according to the present invention.
Figure 4:
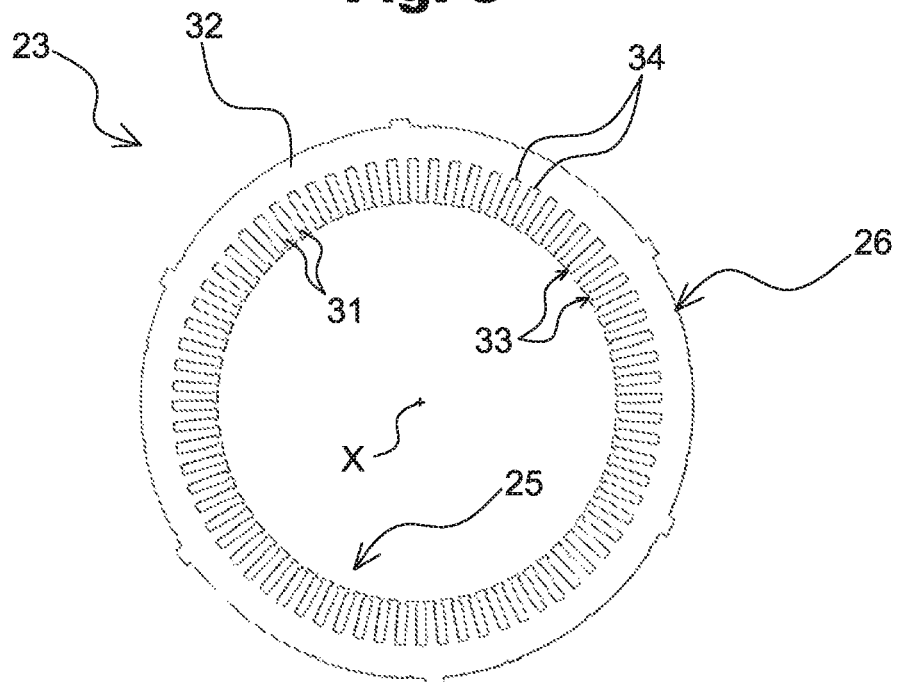
FIG. 4 is a view from above of a stator body of the rotary electrical machine according to the present invention.

As illustrated in FIG. 4, the body 23 is delimited by an inner periphery 25, an outer periphery 26, as well as by two axial end faces 27, 28, as shown in FIG. 2. This body 23 is provided with teeth 31 extending from an inner periphery of an annular yoke 32, and delimiting notches 33 in pairs for fitting of the winding 24. Thus, two successive notches 33 are separated by a tooth 31. The notches 33 open axially into the end faces 27, 28, and radially into the inner cylindrical face 25 of the stator body 23.

Figure 3:
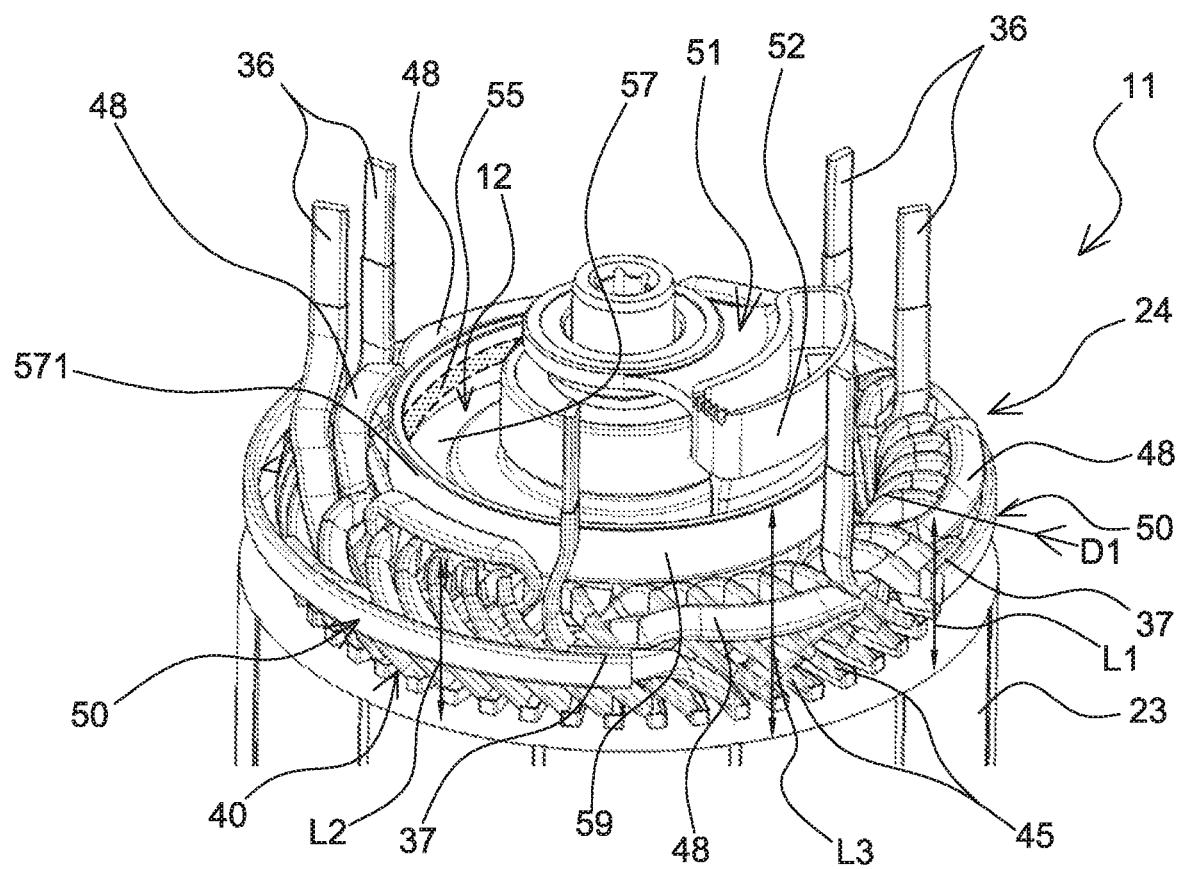
FIG. 3 is a detailed view in perspective of the upper part of the assembly in FIG. 2.

As can be seen in FIGS. 2 and 3, the winding 24 comprises a plurality of phase windings inserted in the notches 33. The insulation between the inner faces of the notches 33 and the winding 24 can be produced for example by means of insulating paper.

These phase windings each have two ends corresponding respectively to a phase winding input 36 and a phase winding output 37. Each phase winding is formed by a plurality of pins 45 connected to one another for example by welding. The welding can be electrical welding. The pins 45 are inserted partially in the notches 33, and form a chignon 40 on both sides of the stator body 23.

The winding 24 comprises at least two phase windings connected electrically to one another by their winding output 37 on a winding connection electrical conductor 50. A chignon 40 is arranged radially between the winding connection electrical conductor 50 and the inner periphery of the stator body 23. The conductor 50 is advantageously in the form of an arc of a circle.

In this case, two winding connection electrical conductors 50 are used. Each winding connection electrical conductor 50 ensures the connection to the neutral point of three winding outputs 37. In this case, the machine is then of the double three-phase type. It will be appreciated that the number of phases of the electrical machine can be adapted according to the application envisaged.

In addition, connectors 48 connect two pins 45 of a single phase winding electrically. The pins 45, which are connected by the corresponding connector 48, are spaced angularly from one another by at least two consecutive pins 45. The connectors 48 form the electrical connection between the phase windings and a neutral point of the winding. The connectors 48 extend circumferentially along the chignon 40 which is situated on the measurement element 52 side.

As can be seen clearly in FIG. 3, the electrical machine 10 additionally comprises a measurement device 51 for measurement of an angular position of the rotor 12. The measurement device 51 comprises a measurement element 52 which can generate signals for measurement of the angular position of the rotor, as well as an annular magnetic target 55 which is secured on a target-holder 57 integral in rotation with the shaft 13. In this case, the measurement element 52 is a sensor of the Hall-effect type. As a variant, the measurement element 52 can be in the form of a resolver.

Under the effect of the rotation of the target-holder 57 together with the shaft 13, the magnetic field received by the sensor 52 varies. The sensor 52 is connected to an electronic command and control device (not represented), and transmits to the latter signals which depend on the magnetic fields received. The device can process said signals in order to deduce from them the angular position and the speed of the rotor.

More specifically, the target-holder 57 is in the form of a cup. The cup comprises on its outer periphery a cylindrical wall 571 with axial orientation. The magnetic target 55 is secured on the inner annular face of the wall 571 which faces towards the shaft 13. In other words, the magnetic target 55 is arranged radially between the wall 571 and the measurement element 52.

The connector 48, which extends circumferentially opposite the sensor 42, comprises a portion which is situated radially between an outer periphery of the stator body 23, and a base of a notch 34. As shown in FIG. 4, the notch base 34 corresponds to the part of the notch 33 which is closest to the yoke 32, and connects two consecutive teeth 31. The portion of the connector 48 which can disrupt the angular position measurements of the rotor 12 is thus spaced radially from the sensor 42.

The connector 48 is situated radially at least partially between an outer periphery of the stator body 23 and the corresponding chignon 40. Preferably, the connector 48 is arranged axially relative to the corresponding axial end face 27 of the stator body 23 at a height L1 which is equal to, or less than, and in particular strictly less than, a height L2 of the chignon 40. As a variant, in the case of chignons with small dimensions, the height of the connector 48 is strictly more than that of the chignon 40.

Advantageously, the wall 571 of the target-holder 57 forms a protective magnetic screen positioned radially between the connector 48 extending opposite the sensor 52, and the magnetic target 55. The connector 48 is arranged axially relative to the end face of the body 27 at a height L1 which is equal to, or less than, the height L3 of the wall 571 which forms a protective magnetic screen.

Preferably, according to a direction D1 of radial displacement illustrated in FIG. 3, the outer periphery of the stator body 23, the winding connection electrical conductor 50, the connector 48, and the corresponding chignon 40 are encountered in succession.

Alternatively, several of the connectors 48 from amongst the plurality of connectors comprise a portion which is situated radially between an outer periphery of the stator body 23 and a base of a notch 34. Alternatively, the assembly of the connectors 48 comprises a portion which is situated radially between an outer periphery of the stator body 23 and a base of a notch 34.

In addition, the electrical machine 10 can be cooled by means of a cooling circuit 61 shown in FIG. 1, which permits the flow of a cooling liquid, in this case oil, inside the machine 10. For this purpose, the cooling circuit 61 comprises a pump 62 which conveys the oil into a central bore 65 provided in the shaft 13, and towards at least two orifices 68 which open out radially, and are arranged axially on both sides of the rotor 12, in order to distribute the cooling liquid inside the machine 10.

A configuration of this type thus makes it possible to convey the cooling liquid towards the two axial end faces of the rotor 12. The cooling circuit operates in a closed loop, such that the cooling liquid is collected by the pump 62 from a reservoir 69, and is recuperated after circulation in the machine 10 into said reservoir 69.

In addition, the rotor 12 can comprise two flanges 71 which are each placed against an axial end face of the rotor 12. These flanges 71 ensure axial retention of the magnets 20 inside cavities in the rotor body 19, and are also used to balance the rotor 12. Each flange 71 can advantageously be provided with at least one projection body 72, constituted by a blade, which is designed to project by centrifugation, towards the winding chignons 40, the cooling liquid which reaches the corresponding end face.

It will be appreciated that the foregoing description has been provided purely by way of example and does not limit the field of the invention, a departure from which would not be constituted by replacement of the different elements by any other equivalents.

The invention claimed is:

1. A rotary electrical machine (10), comprising:
   a rotor (12);
   a measurement device (51) for measurement of an angular position of the rotor (12), the rotor (12) comprising a measurement element (52) generating signals for measurement of the angular position of the rotor (12);
   a stator (11) comprising:
     a stator body (23) comprising a plurality of notches (33);
     a winding (24) comprising a plurality of phase windings, each of the phase windings having a winding input (36) and a winding output (37);
     each phase winding being formed by a plurality of pins (45) inserted partially in the notches (33) and forming a chignon (40); and
   at least one connector (48) electrically connecting two of the pins (45) of a single phase winding, the two of the pins (45) being spaced angularly from one another by at least two consecutive pins;
   the at least one connector (48) extending circumferentially along the chignon (40) and opposite the measurement element (52),
   the at least one connector (48) comprising a portion situated radially between an outer periphery of the stator body (23) and a base of one of the notches (34).

2. The rotary electrical machine according to claim 1, wherein the at least one connector (48) is situated radially at least partially between an outer periphery of the stator body (23) and the chignon (40).

3. The rotary electrical machine according to claim 2, wherein the at least one connector (48) is arranged axially relative to an axial end face (27) of the stator body (23) at a height (L1) which is equal to or less than a height (L2) of the chignon (40).

4. The rotary electrical machine according to claim 3, wherein the measurement device (51) comprises a magnetic target (55).

5. The rotary electrical machine according to claim 3, wherein the measurement element (52) is a Hall-effect sensor.

6. The rotary electrical machine according to claim 2, wherein the measurement device (51) comprises a magnetic target (55).

7. The rotary electrical machine according to claim 2, wherein the measurement element (52) is a Hall-effect sensor.

8. The rotary electrical machine according to claim 1, wherein the measurement device (51) comprises a magnetic target (55).

9. The rotary electrical machine according to claim 8, wherein the measurement device (51) further comprises a wall (571) forming a protective magnetic screen positioned radially between the at least one connector (48) and the magnetic target (55).

10. The rotary electrical machine according to claim 9, wherein the at least one connector (48) is arranged axially relative to an axial end face (27) of the stator body (23) at a height (L1) which is equal to or less than a height (L3) of the wall (571) forming the protective magnetic screen.

11. The rotary electrical machine according to claim 10, wherein the magnetic target (55) is arranged radially between the wall (571) and the measurement element (52).

12. The rotary electrical machine according to claim 10, wherein the measurement element (52) is a Hall-effect sensor.

13. The rotary electrical machine according to claim 8, wherein the measurement element (52) is a Hall-effect sensor.

14. The rotary electrical machine according to claim 9, wherein the magnetic target (55) is arranged radially between the wall (571) and the measurement element (52).

15. The rotary electrical machine according to claim 14, wherein the measurement element (52) is a Hall-effect sensor.

16. The rotary electrical machine according to claim 9, wherein the measurement element (52) is a Hall-effect sensor.

17. The rotary electrical machine according to claim 1, wherein the measurement element (52) is a Hall-effect sensor.

18. The rotary electrical machine according to claim 1, wherein at least two phase windings are connected electrically to one another by the winding outputs (37) thereof on a winding connection electrical conductor (50), and wherein the chignon (40) is arranged radially between the winding connection electrical conductor (50) and an inner periphery of the stator body (23).

19. The rotary electrical machine according to claim 18, wherein, in a radial direction of displacement (D1), the configuration of the rotary electrical machine (10) is such that an outer periphery of the stator body (23), the winding connection electrical conductor (50), the at least one connector (48), and the chignon (40) are encountered in succession.

\* \* \* \* \*